United States Patent
Canteleux et al.

(10) Patent No.: US 7,243,992 B2
(45) Date of Patent: Jul. 17, 2007

(54) VEHICLE SEAT STRUCTURE, AND A VEHICLE PROVIDED WITH A SEAT HAVING SUCH A STRUCTURE

(75) Inventors: Joël Canteleux, Gallardon (FR); Augusto Da Costa, Etrechy (FR)

(73) Assignee: Faurecia Sieges d'Automobile, Nanterre (FR)

( * ) Notice: Subject to any disclaimer, the term of this patent is extended or adjusted under 35 U.S.C. 154(b) by 49 days.

(21) Appl. No.: 11/010,959

(22) Filed: Dec. 13, 2004

(65) Prior Publication Data
US 2005/0134100 A1    Jun. 23, 2005

(30) Foreign Application Priority Data
Dec. 22, 2003    (FR) .................................. 03 15180

(51) Int. Cl.
*B60N 2/42*    (2006.01)
*A47C 1/00*    (2006.01)

(52) U.S. Cl. .............................. 297/216.1; 297/344.15; 297/325

(58) Field of Classification Search ............. 297/216.1, 297/344.15, 344.1, 325
See application file for complete search history.

(56) References Cited

U.S. PATENT DOCUMENTS

| | | | |
|---|---|---|---|
| 4,225,184 A * | 9/1980 | Strowick ..................... | 297/468 |
| 4,798,597 A | 1/1989 | Vaillancourt | |
| 5,697,674 A | 12/1997 | Aufrere et al. ........ | 297/344.15 |
| 5,882,061 A | 3/1999 | Guillouet | |
| 6,116,689 A * | 9/2000 | Bauer et al. ........... | 297/344.15 |
| 6,250,705 B1 | 6/2001 | Zuch | |
| 6,467,849 B1 | 10/2002 | Deptolla ..................... | 297/464 |
| 6,502,799 B2 * | 1/2003 | Lepaule ..................... | 248/423 |
| 6,505,888 B1 | 1/2003 | Teufel et al. | |
| 6,533,351 B2 * | 3/2003 | Deptolla ................... | 297/216.2 |
| 6,733,075 B2 * | 5/2004 | Schumann et al. .... | 297/344.12 |
| 6,902,234 B2 * | 6/2005 | Becker et al. ........... | 297/216.1 |
| 2002/0024242 A1 * | 2/2002 | Becker et al. ........... | 297/216.1 |
| 2003/0173487 A1 | 9/2003 | Koga et al. ................. | 248/421 |

FOREIGN PATENT DOCUMENTS

| | | | |
|---|---|---|---|
| DE | 196 22 157 | 12/1997 | |
| DE | 198 41 197 | 3/2000 | |
| DE | 100 25 676 | 5/2000 | ....................... 2/16 |
| EP | 0 265 747 | 5/1988 | |
| EP | 0 806319 | 11/1997 | |
| FR | 2 737 868 | 2/1997 | ....................... 2/16 |
| FR | 2 768 379 | 3/1999 | ....................... 2/16 |
| FR | 2 796 602 | 1/2001 | ....................... 2/2 |
| WO | WO 01/12460 | 2/2001 | |

OTHER PUBLICATIONS

French Preliminary Search Report, dated Jul. 2, 2004, Appl. No. FR 0 315 180.

* cited by examiner

*Primary Examiner*—David Dunn
*Assistant Examiner*—Sarah B. McPartlin
(74) *Attorney, Agent, or Firm*—McCracken & Frank LLP

(57) ABSTRACT

The structure of the seat proper of a vehicle seat comprises:
  a frame for a seat proper, the frame including a side cheek plate; and
  a coupling system comprising a link mounted to pivot on a base to enable the seat proper to move at least vertically relative to said base.

The coupling system has a first latch surface.

The seat structure further comprises an anchoring element provided with a second latch surface.

The anchoring element is mounted to move on the cheek plate between a locked position and an unlocked position.

8 Claims, 2 Drawing Sheets

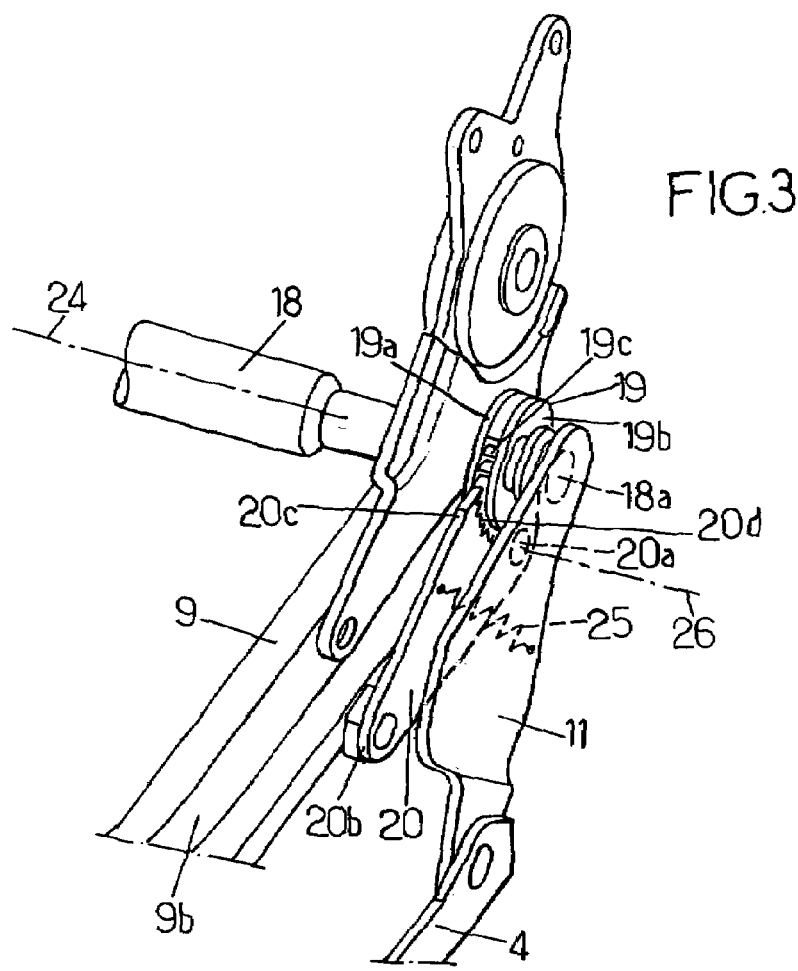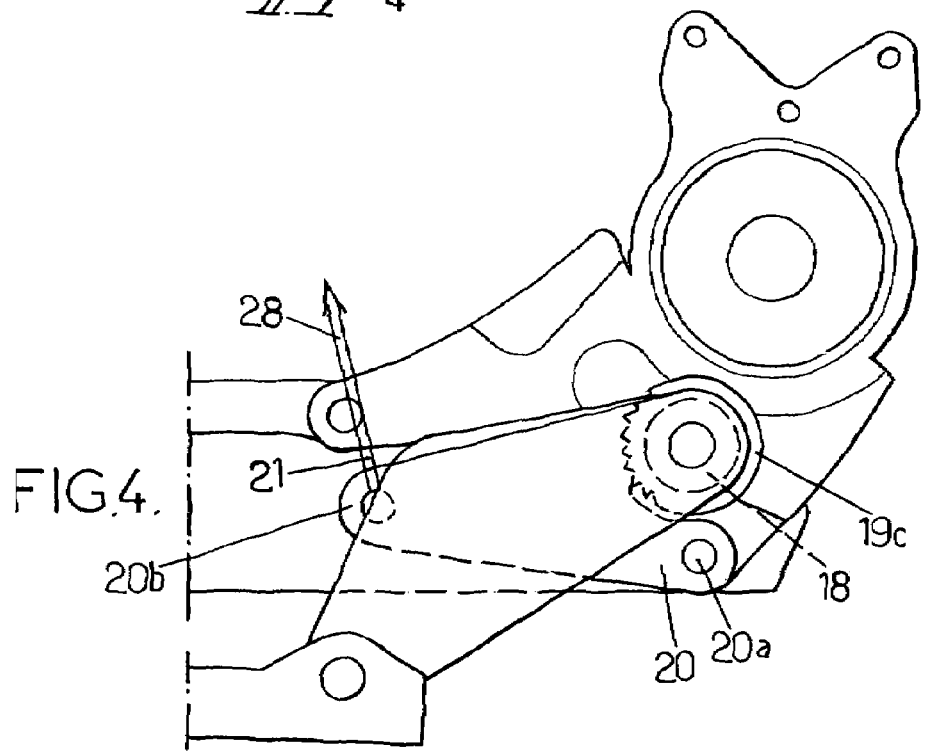

VEHICLE SEAT STRUCTURE, AND A VEHICLE PROVIDED WITH A SEAT HAVING SUCH A STRUCTURE

FIELD OF THE INVENTION

The present invention relates to vehicle seat structures.

More particularly, the invention relates to a structure for a vehicle seat proper, the structure comprising:

a rigid frame for a seat proper, the frame including at least one side cheek plate extending between a front portion and a rear portion; and a coupling system comprising a link having a bottom portion mounted to pivot on a base and a top portion mounted to pivot relative to the rear portion of said cheek plate about a first pivot axis so that said bottom portion of the link pivoting relative to said base causes said rear portion of the seat proper to move at least vertically relative to said base; said coupling system having a first latch surface.

BACKGROUND OF THE INVENTION

On a vehicle seat including a seat proper provided with such a structure, a user can adjust the vertical position (the height) of the seat proper relative to the floor, thereby enabling users of different sizes to occupy the seat under conditions that are good for each of them. A seat with a seat proper whose height is adjustable is described, for example, in French Patent Application FR 2 737 868. That seat is provided with four such links coupled together in pairs between two side cheek plates of the seat frame.

Such seats have already been used successfully in the past in various vehicles. In addition, in order to adapt more easily to the space inside vehicles, seat-integrated seatbelt systems have recently been developed that make it easy for a seat containing a seatbelt to be mounted in a vehicle. Since the belt is mounted directly on the seat, it is possible to ignore constraints related to the geometrical shape of the structure of the vehicle that can arise when a seatbelt is to be mounted in the vehicle around the seat as already installed.

An essential condition for implementing such integrated seatbelts is to guarantee safety in the event of frontal impact because the seatbelt is no longer connected to the (rigid) structure of the vehicle itself, but only to the seat. In a seat provided with a seat proper of the above-mentioned type, it was foreseen that such an integrated seatbelt, when driven violently upwards by the occupant in the event of frontal impact, would pivot the links of the seat proper that are used for adjusting the seat vertically. Therefore, a system as described, for example, in DE 100 25 676 was proposed. Unfortunately, such a system is not really effective because its operation relies on lugs having two pivot points, i.e. it is a system that is not only complex, but that also does not guarantee the necessary robustness in the event of impact. An effective system is thus needed in order to guarantee safety for the occupant of such a seat provided with an integrated seatbelt.

OBJECTS AND SUMMARY OF THE INVENTION

A particular object of the present invention is to provide such a seat element.

To this end, according to the invention, a seat structure of the type in question further comprises an anchoring element provided with a second latch surface and to which a seatbelt is designed to be secured;

and the anchoring element is mounted to pivot on said side cheek plate about a second pivot axis distinct from the first axis, said anchoring element being adapted so that traction exerted by said seatbelt on the anchoring element along a seatbelt traction axis against forces exerted by return means causes the anchoring element to pivot about the second axis between firstly a unlocked position in which the second latch surface of said anchoring element is held at some distance away from the first latch surface of the coupling system by the return means, and secondly a locked position in which the second latch surface co-operates with the first latch surface to prevent the side cheek plate of the seat frame from pivoting relative to the link.

By means of these provisions, occupant safety is guaranteed by latching the anchoring element onto the coupling system including the link in the event of frontal impact.

This system offers the additional advantage that it is easily adaptable to any type of vehicle shape, regardless of whether the link is arranged inside or outside the frame of the seat proper.

In preferred embodiments of the invention, it is optionally possible to use one or more of the following provisions:

the coupling system comprises:

an axial connection member secured to said top portion of the link, and mounted to pivot relative to said cheek plate; and a ring constrained to rotate with the axial connection member and having said first latch surface;

said axial connection member passes through an opening provided at least in part in said cheek plate, said cheek plate has an inside face and an outside face facing in the opposite direction to the direction in which said inside face faces, said anchoring element being mounted on said outside face of the cheek plate, and said link is disposed facing said inside face of the cheek plate;

said axial connection member passes through an opening provided at least in part in said cheek plate, said cheek plate has an inside face and an outside face facing in the opposite direction to the direction in which said inside face faces, said anchoring element being mounted on said outside face of the cheek plate, and said link is disposed facing said outside face of the cheek plate;

on either side of the first latch surface, said ring is further provided with a first bearing piece having a contact surface mounted facing said link and with a second bearing piece having a contact surface mounted facing said cheek plate;

the structure further comprises a second side cheek plate parallel to the first side cheek plate, and a second link, parallel to the first link, and having a bottom portion mounted to pivot on a base and a top portion mounted to pivot relative to the rear portion of said second cheek plate, said axial connection member being secured to said top portion of the second link and mounted to pivot relative to said second cheek plate;

so that said bottom portions of said links pivoting together relative to said base causes said rear portion of the seat frame to move at least vertically relative to said base;

said first latch surface is provided with teeth, and said second latch surface is provided with teeth complementary to the teeth of said first latch surface;

said anchoring element is mounted to pivot relative to said cheek plate;

the structure further comprises at least one runner comprising:

a stationary rail serving to be secured to a vehicle floor; and a moving rail including at least a portion forming said base.

In another aspect, the invention relates to a vehicle seat including a seat proper having such a structure.

BRIEF DESCRIPTION OF THE DRAWINGS

Other characteristics and advantages of the invention appear from the following detailed description of one of the embodiments thereof, given by way of non-limiting example, and with reference to the accompanying drawings.

In the drawings:

FIG. 3 is a perspective view of a variant embodiment of the invention; and

FIG. 4 is a side view of the seat of FIG. 3 while it is being used.

MORE DETAILED DESCRIPTION

In the various figures, like references designate elements that are identical or similar.

Figure 1:
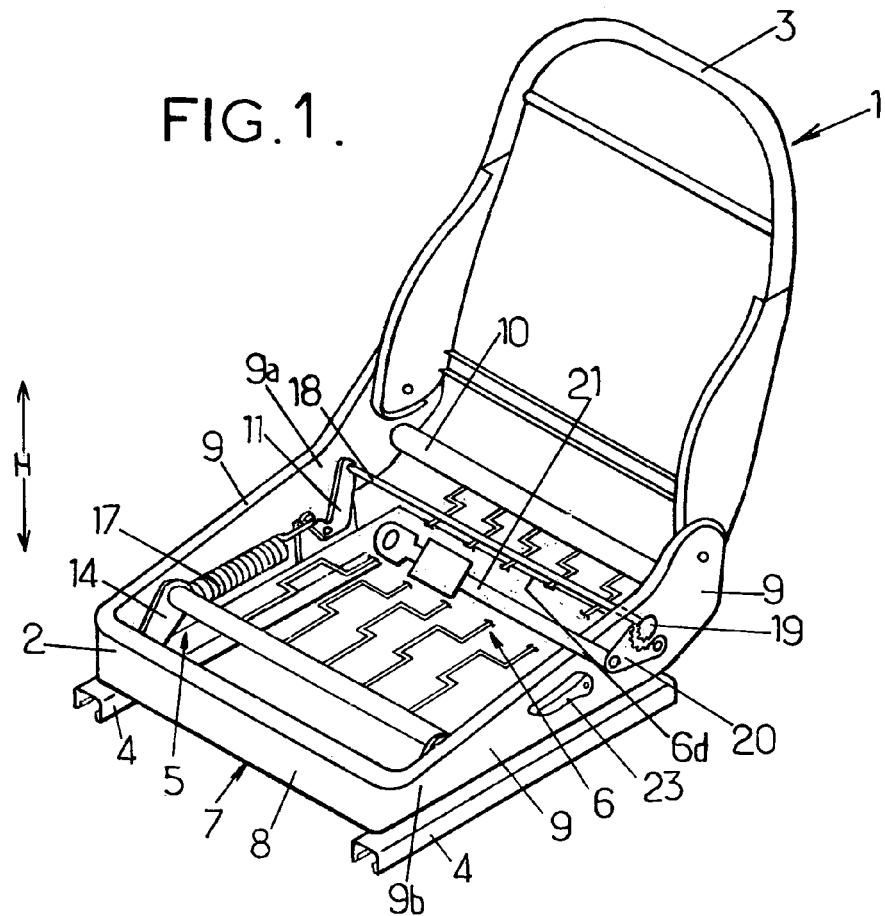
FIG. 1 is a perspective view of a vehicle seat equipped with a raising system.

As shown diagrammatically in FIG. 1, the invention relates to a vehicle seat 1, in particular a motor vehicle front seat.

The seat comprises firstly a seat proper 2 which extends in a "longitudinal" direction between a rear end and a front end, and secondly a seat back 3 which is generally mounted to pivot relative to the seat proper.

The seat proper 2 is supported by a raising mechanism 5 (FIG. 2) which is mounted on longitudinal runners 4 which are themselves secured to the floor P of the vehicle. In this way, the seat proper can be adjusted both longitudinally, i.e. forwards or backwards by sliding along the runners 4, and also vertically by being raised or lowered along a vertical axis H. The seat proper 2 can, for example, comprise a seat cushion (not shown) supported by substantially horizontal suspension webbing 6 which is disposed substantially at the center of a rigid structure 7, which is itself substantially horizontal.

In the example shown, the structure 7 has two side cheek plates 9 interconnected by a front crosspiece 8, the side cheek plates and front crosspiece being, in the present example, made integrally from a folded metal sheet. Each of the cheek plates 9 thus has an inside face 9a facing towards the inside of the seat proper and facing the other cheek plate, and an outside face 9 facing in the opposite direction from the direction in which the inside face faces. The structure 7 further includes a rear metal crosspiece 10 which, for example, is welded to the rear ends of the two side cheek plates 9 of the structure.

Figure 2:
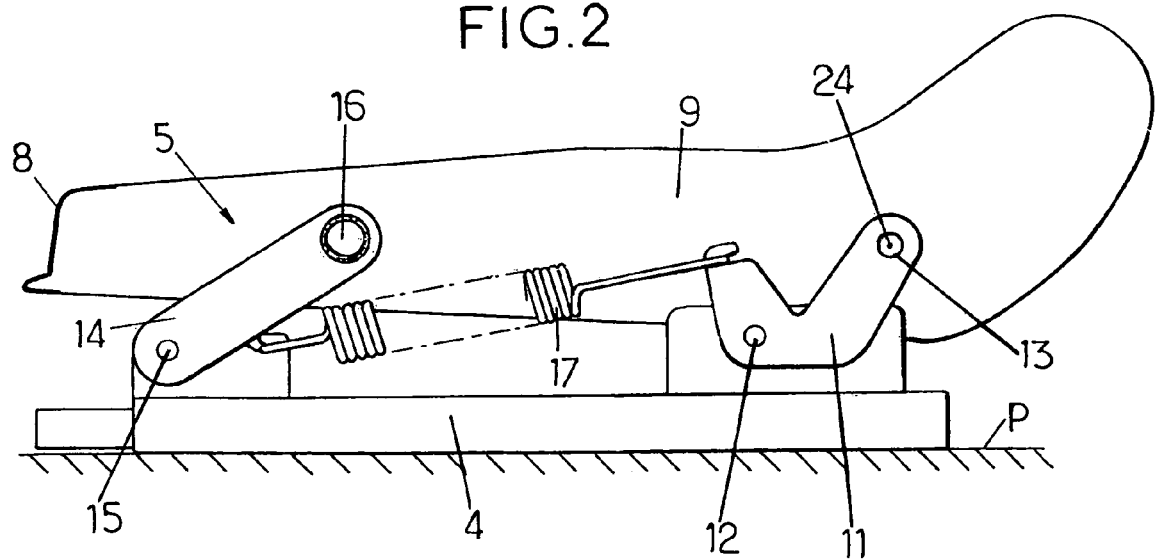
FIG. 2 is a side view showing the inside face of a cheek plate of such a seat.

The particular raising mechanism 5 shown in the drawings and clearly visible in particular in FIG. 2, conventionally comprises:

two rear links 11 disposed on either side of the seat and each mounted to pivot firstly on the corresponding runner 4 by means of a bottom pivot and secondly on the corresponding side cheek plate 9 by means of a top pivot 13, the two top pivots 13 having a first pivot axis 24 that is common, and the two bottom pivots 12 also having a common pivot axis; and two front links 14 disposed on either side of the seat and each connected firstly to the corresponding runner 4 by means of a bottom pivot 15 and secondly to the corresponding side cheek plate 9 by means of a top pivot 16, the two bottom pivots 15 having a common pivot axis, and the two top pivots 16 also having a common pivot axis.

All four links 11, 14 thus pivot in vertical planes that are parallel to the longitudinal axis.

In addition, in the example in question, the links 11 and 14 extend upwards and backwards from their respective bottom pivots, said links sloping to a relatively small extent relative to the horizontal when the seat proper is in its lowest position, as shown in FIG. 2, and said links sloping more steeply relative to the horizontal, i.e. closer to the vertical, when the seat proper 2 is raised higher than its lowest position.

The raising mechanism further comprises an assistance device which, in the example in question, is constituted by two helical springs 17. Each of the springs 17 is mounted at one end on a runner 4 and at the other end on a bottom portion of the corresponding rear link 11 while exerting a traction force on the bottom portion of said rear link that tends to raise said link. Thus, the springs 17 urge the seat proper 2 upwards while compensating at least in part for the weight of a user sitting on the seat.

The raising mechanism 5 can also comprise a locking device (not shown) that can be actuated by a user for the purpose selectively of allowing the seat proper to move vertically, or of preventing the seat proper from moving vertically.

The seat of FIGS. 1 and 2 is provided with an integrated seatbelt system comprising a seatbelt 21 that is anchored at a bottom end over an anchoring portion in a manner that is described in more detail below.

FIG. 3 thus shows a seat equipped with such a raising system including an integrated seatbelt system. While FIGS. 1 and 2 show a structure in which the links 11 and 14 are situated inside the seat structure 2, their top ends being interconnected by a tube 18 mounted to pivot relative to the side cheek plates 9 of the seat structure so as to form the top pivot about the first pivot axis 24, FIG. 3 shows a seat structure in which the link 11 is situated outside the seat structure. The tube 18 is mounted to pass through and to pivot in an opening provided for this purpose in the side upright 9 about the first pivot axis 24, and is connected at its end 18a to the top portion of the link 11.

A ring 19 is also mounted on the tube 18, the ring comprising a first bearing piece 19a in the form of a thin disk having a contact surface, and a second bearing piece 19b also in the form of a thin disk that is spaced apart from and parallel to the first bearing piece 19a, and also has a contact surface facing in the opposite direction from the direction in which the contact surface of the first bearing piece faces. For example, the contact surfaces are made of materials having low coefficients of friction so as to facilitate any movements of the link 11 relative to the ring 19 and of the ring 19 relative to the side cheek plate 9.

The two contact surfaces are separated by a wheel 19c that is toothed at least in part, in the form of a disk carrying a series of teeth on its periphery, thereby forming a first latch surface 19c.

The seat structure further comprises an anchoring element 20 mounted on the seat proper side cheek plate 9. For example, the anchoring element 20 is in the form of a triangular piece having a first corner 20a provided with an opening serving to receive a pivot pin forming a second pivot axis 26 for pivotally mounting the anchoring element 20 on the side upright 9 of the seat structure, and a second corner 20b on which a seatbelt stem is mounted. In addition, on a side connecting the first corner 20a to the third corner 20c, the anchoring element 20 has a portion 20d shaped to co-operate with the toothed wheel 19c of the ring 19. This portion is thus in the shape of a circular arc provided with teeth that are complementary to the teeth on the ring 19.

In the normal-use position, the device is held as shown in FIG. 3, in an unlocked position in which the teeth of the anchoring element 20 forming a second latch surface 20*d* are held some distance away from the teeth situated on the periphery of the toothed wheel 19*c* of the ring 19 by return means such as a suitably placed return spring 25 or the like. The tube 18 as provided with its ring 19, and the link 11 on which it is mounted thus form a system of coupling between the seat proper side cheek plate 9 and the runner 4.

FIG. 4 shows how the latch of the invention operates. As is well known, in the event of frontal impact, the occupant of the seat undergoes movement relative to the seat, mainly upwards and forwards. This movement is conventionally restrained by the seatbelt, and in particular the upward movement is reduced by the lap portion of the seatbelt. In the event of a violent impact, the upward movement of the occupant results in traction on the seatbelt 21 along a seatbelt traction axis 28, which traction acts against the return means 25 to exert a moment of force, and causes the anchoring element 20 to pivot about the second pivot axis 26 relative to the side cheek plate 9 of the seat proper that is situated at the corner 20*a*. The teeth on the anchoring element 20, and the teeth on the toothed wheel 19*c* of the ring 19 then come into contact with one another in a locked position, and they take up the forces applied to the structure by the belt 21. The impact tends to cause the anchoring element 20 to move in rotation clockwise in FIG. 4, and tends to cause the link 11 (and thus the seat structure 7) to move in rotation about the bottom pivot of the link 11 counterclockwise in FIG. 4. The teeth on the anchoring element 20 and on the toothed wheel 19*c* are thus brought into meshing engagement by these two opposing movements, such engagement preventing the movement from continuing. The occupant is thus restrained effectively on the seat, without the seat being suddenly subjected to upward movement due to the presence of the function for raising the seat proper.

In addition, it should also be noted that the system shown in FIGS. 3 and 4 for the links 11, 14 situated outside the seat frame can also be disposed for links 11, 14 situated inside the seat frame, as shown in FIG. 1. The cheek plate 9 is then situated between firstly the link 11 and secondly the ring 19 and the coupling piece 20, the tube 18 passing through the cheek plate 9 at least between the link 11 and the ring 19.

What is claimed is:

1. A system comprising a seat belt and a structure for a motor vehicle seat proper, the structure comprising:
   a rigid frame for said seat proper, the frame extending between a front portion and a rear portion, the frame including a side cheek plate extending from said rear portion of the rigid frame to said front portion of the rigid frame; and
   a coupling system comprising a link having a bottom portion mounted to pivot on a base and a top portion mounted to pivot relative to the rear portion of said rigid frame about a first pivot axis so that said bottom portion of the link pivoting relative to said base in a third direction causes said rear portion of the rigid frame to move at least vertically upward relative to said base;
   said coupling system having an axial connection member secured to said top portion of the link, and mounted to pivot relative to said cheek plate; and a ring constrained to rotate with the axial connection member and having a first latch surface, so that said first latch surface is constrained to rotate with the link;
   said seat structure further comprising an anchoring element provided with a second latch surface and to which said seatbelt is directly secured;
   and wherein the anchoring element is mounted to pivot on said rigid frame about a second pivot axis distinct from the first axis, said anchoring element being adapted so that traction exerted by said seatbelt on the anchoring element along a seatbelt traction axis causes the anchoring element to pivot about the second axis in a second direction, from an unlocked position in which the second latch surface of said anchoring element is held at some distance away from the first latch surface of the coupling system by return means exerting forces in a first direction of rotation opposite to the second direction of rotation, and secondly to a locked position in which the second latch surface co-operates with the first latch surface to prevent the bottom portion of the link from pivoting in said third direction relative to said base.

2. A system according to claim 1, in which system said axial connection member passes through an opening provided at least in part in said cheek plate, in which system said cheek plate has an inside face and an outside face facing in the opposite direction to the direction in which said inside face faces, said anchoring element being mounted on said outside face of the cheek plate, and in which system said link is disposed facing said inside face of the cheek plate.

3. A system according to claim 1, in which system said axial connection member passes through an opening provided at least in part in said cheek plate, in which system said cheek plate has an inside face and an outside face facing in the opposite direction to the direction in which said inside face faces, said anchoring element being mounted on said outside face of the cheek plate, and in which system said link is disposed facing said outside face of the cheek plate.

4. A system according to claim 3, in which, on either side of the first latch surface, said ring is further provided with a first bearing piece having a contact surface mounted facing said link and with a second bearing piece having a contact surface mounted facing said cheek plate.

5. A system according to claim 1, in which said structure further comprises a second side cheek plate parallel to the first side cheek plate, and a second link, parallel to the first link, and having a bottom portion mounted to pivot on a base and a top portion mounted to pivot relative to the rear portion of said second cheek plate, said axial connection member being secured to said top portion of the second link and mounted to pivot relative to said second cheek plate;
   so that said bottom portions of said links pivoting together relative to said base causes said rear portion of the seat frame to move at least vertically upward relative to said base.

6. A system according to claim 1, in which said first latch surface is provided with teeth, and in which said second latch surface is provided with teeth complementary to the teeth of said first latch surface.

7. A system according to claim 1, in which the frame includes a side cheek plate extending from said rear portion of the rigid frame to said front portion of the rigid frame and in which said anchoring element is mounted to pivot relative to said cheek plate.

8. A system according to claim 1, wherein said structure further comprises at least one runner comprising:
   a stationary rail serving to be secured to a vehicle floor; and
   a moving rail including at least a portion forming said base.

* * * * *